(12) United States Patent
Dehne et al.

(10) Patent No.: US 6,902,051 B2
(45) Date of Patent: Jun. 7, 2005

(54) WORKPIECE TREATMENT SYSTEM AND CONVEYOR ASSEMBLY

(75) Inventors: Noel F. Dehne, Novi, MI (US); Melvin Edwards, Livonia, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 10/357,054

(22) Filed: Feb. 3, 2003

(65) Prior Publication Data

US 2004/0149549 A1 Aug. 5, 2004

(51) Int. Cl.[7] ........................... B65G 17/32; B65G 37/00
(52) U.S. Cl. .............................. 198/346.3; 198/377.02; 198/377.03
(58) Field of Search .................... 198/346.3, 377.02, 198/377.03

(56) References Cited

U.S. PATENT DOCUMENTS

| | | |
|---|---|---|
| 2,597,914 A | 5/1952 | Whitworth et al. |
| 2,598,163 A | 5/1952 | Halls |
| 2,598,201 A | 5/1952 | Williams |
| 2,598,246 A | 5/1952 | Fowler |
| 2,657,666 A | 11/1953 | Fowler |
| 2,658,008 A | 11/1953 | Williams et al. |
| 2,678,025 A | 5/1954 | Straky |
| 3,952,699 A | 4/1976 | Durr et al. |
| 4,062,437 A | 12/1977 | Knapp |
| 4,772,374 A | 9/1988 | Urquhart et al. |
| 4,874,639 A | 10/1989 | Matsui et al. |
| 4,911,818 A | 3/1990 | Kikuchi et al. |
| 4,919,977 A | 4/1990 | Yamane et al. |
| 4,968,530 A | 11/1990 | Yamane et al. |
| 4,988,537 A | 1/1991 | Tanimoto et al. |
| 5,009,931 A | 4/1991 | Yamane et al. |
| 5,063,085 A | 11/1991 | Yamane et al. |
| 5,091,215 A | 2/1992 | Tanimoto et al. |
| 5,094,183 A | 3/1992 | Hamasaki |
| 5,100,705 A | 3/1992 | Yamane et al. |
| 5,104,682 A | 4/1992 | Nakahama et al. |
| 5,110,440 A | 5/1992 | Case |

(Continued)

FOREIGN PATENT DOCUMENTS

| | | |
|---|---|---|
| AU | 145298 | 2/1952 |
| AU | 145299 | 2/1952 |
| DE | 1 922 751 | 11/1970 |
| DE | 25 12 762 A1 | 9/1976 |
| DE | 29 01 027 A1 | 7/1980 |
| DE | 32 17 553 | 10/1983 |
| DE | 41 10 149 | 10/1991 |
| DE | 43 04 145 C1 | 4/1994 |
| DE | 44 10 477 C1 | 9/1995 |
| DE | 44 32 352 A1 | 3/1996 |
| EP | 0 278 482 A1 | 8/1988 |
| EP | 0 360 301 A2 | 3/1990 |
| EP | 0 683 699 B1 | 2/1994 |
| GB | 644169 | 10/1950 |
| GB | 1019887 | 2/1966 |
| GB | 1395383 | 5/1975 |
| GB | 1434348 | 5/1976 |
| JP | 63-197584 | 8/1988 |
| JP | 4-145976 | 5/1992 |
| WO | WO 94/17926 | 8/1994 |
| WO | WO 98/15359 A1 | 4/1998 |
| WO | WO 01/17691 A1 | 3/2001 |
| WO | WO 02/060598 A1 | 8/2002 |

*Primary Examiner*—Douglas Hess
(74) *Attorney, Agent, or Firm*—Dickinson Wright PLLC

(57) ABSTRACT

A conveyor assembly including a conveyor defining a conveying direction and a carrier assembly operably coupled to the conveyor. The carrier assembly includes a carrier frame, a rotating mechanism coupled to move with the carrier and having a rotatable shaft with a rotary axis parallel to the conveying direction. The carrier assembly further includes a workpiece mounting frame coupled to rotate with the rotatable shaft. The invention is also directed to a workpiece treatment system having the conveyor assembly described above as well as a method of using the conveyor assembly to convey workpieces through a treatment system.

18 Claims, 8 Drawing Sheets

U.S. PATENT DOCUMENTS

| | | |
|---|---|---|
| 5,115,758 A | 5/1992 | Suzuki et al. |
| 5,169,683 A | 12/1992 | Matsui et al. |
| 5,220,991 A | 6/1993 | Yamaguchi et al. |
| 5,242,044 A | 9/1993 | Yamaguchi et al. |
| 5,560,469 A * | 10/1996 | Ohara et al. ............. 198/345.1 |
| 5,565,244 A | 10/1996 | Matsui et al. |
| 5,651,820 A | 7/1997 | Ogasawara et al. |
| 5,651,822 A | 7/1997 | Heckmann |
| 5,686,148 A | 11/1997 | Suzuki |
| 5,725,669 A | 3/1998 | Heckmann |
| 5,743,962 A | 4/1998 | Ogasawara et al. |
| 5,927,924 A * | 7/1999 | Kemmer et al. ............... 414/21 |
| 5,972,112 A | 10/1999 | Wood et al. |
| 6,070,636 A | 6/2000 | Zaher |
| 6,254,681 B1 | 7/2001 | Simon et al. |
| 6,372,107 B1 | 4/2002 | Besinger et al. |
| 6,419,983 B1 | 7/2002 | Kreuzer |
| 6,659,262 B2 * | 12/2003 | Nishida et al. ........... 198/346.3 |
| 6,745,888 B2 * | 6/2004 | Nishida et al. ........... 198/346.3 |
| 6,746,720 B2 * | 6/2004 | Nishida et al. ........... 427/430.1 |
| 2001/0050046 A1 | 12/2001 | Nishida et al. |
| 2003/0178286 A1 | 9/2003 | Jaynes et al. |

\* cited by examiner

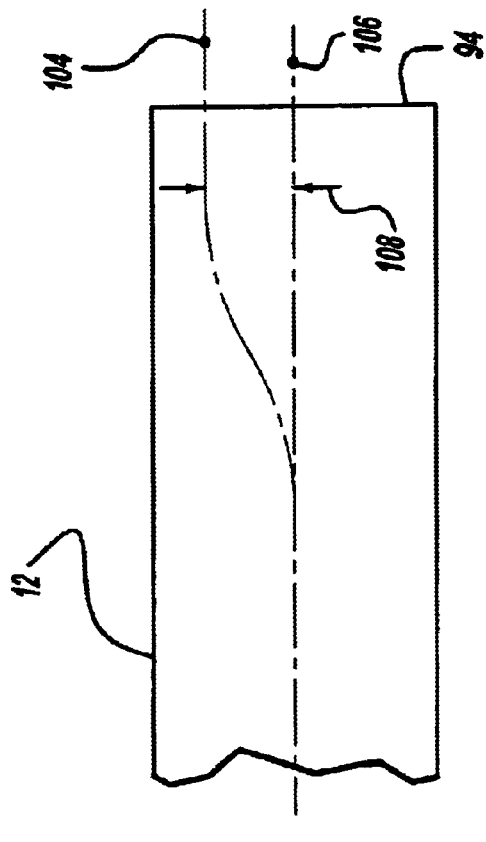
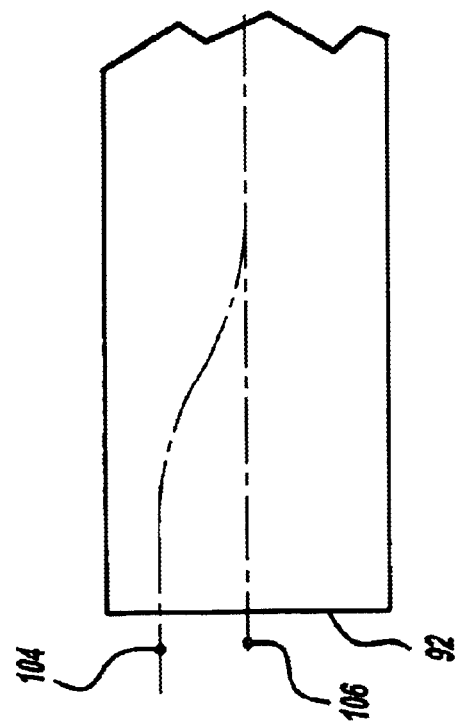
FIG-6

US 6,902,051 B2

WORKPIECE TREATMENT SYSTEM AND CONVEYOR ASSEMBLY

BACKGROUND OF THE INVENTION

The present invention is generally directed to a treatment system for a workpiece and, more particularly, to a treatment system having one or more fluid tanks and a conveyor assembly to translate and rotate vehicle bodies into and out of the fluid tanks.

The material handling art includes numerous systems for transporting workpieces through numerous types of manufacturing facilities. One area of interest is the manufacture and assembly of vehicles, particularly vehicle bodies. When assembling a vehicle body, it is common to move the bodies through a predetermined sequence of production areas via conveyors. The conveyors can take numerous forms including belt, chain, electrified rail, and skillet systems. The selection of an appropriate conveyor for a production area is dependent on a variety of factors including maintaining through-put rates for the system and the nature of the assembly, manufacturing, or production processes to be performed on the body in each area.

Vehicle body manufacturing facilities commonly include a treatment area prior to body painting. In the treatment area, the vehicle body is dipped in treatment tanks to clean the body and to apply a coating. For example, the vehicle body may be conveyed through a multiple stage treatment area which commonly includes phosphate and E-coat applications. It is generally known in the art that the treatment of the vehicle bodies in the treatment area is enhanced by complete immersion of the vehicle bodies for a predetermined time in the fluid filled tanks. Thus, the vehicle bodies may be attached to a conveyor or rotating mechanism that rotates the vehicle body into the tank. For example, one conventional system (disclosed in U.S. Pat. No. 6,419,983) touts the continuous movement of workpieces along a direction of movement while rotating the workpieces in the direction of movement and about an axis aligned across the direction of movement. The workpiece is completely introduced into and later removed from the treatment tank as a result of the rotation. However, like other prior art systems, the conveyor used in this system suffers from numerous disadvantages. For example, the conveyor is incompatible with conveyor assemblies that may be used in other areas of the manufacturing facility thereby requiring transfer of workpieces between different conveyor assemblies before and after treatment. Moreover, the prior art conveyor uses a pair of laterally spaced drive chains that must be moved in a synchronous manner to ensure smooth workpiece movement through the treatment area.

Notwithstanding the number of different approaches to transporting workpieces through dipping treatment areas, the art has not adequately addressed many manufacturing concerns including providing a treatment system conveyor assembly that facilitates transportation of the workpieces from and to other treatment applications, accommodating the relatively extreme loads created by rotating vehicle bodies, and improving the ability to index or otherwise control the movement of workpieces through the treatment area.

SUMMARY OF THE INVENTION

In view of the above, the present invention is directed to a conveyor assembly that generally includes a conveyor defining a conveying direction and a carrier assembly operably coupled to the conveyor. The carrier assembly includes a carrier frame, a rotating mechanism coupled to move with the carrier and having a rotatable shaft with a rotary axis parallel to the conveying direction. The carrier assembly further includes a workpiece mounting frame coupled to rotate with the rotatable shaft. The invention is also directed to a workpiece treatment system having the conveyor assembly described above as well as a method of using the conveyor assembly to convey workpieces through a treatment system.

Among the advantages provided by certain embodiments of the present invention is the ease with which the conveyor assembly may be effectively integrated into the overall manufacturing system and the minimization or elimination of the need to transfer workpieces from or to different types of conveyor assemblies. For example, the invention may be used with numerous conveying systems, such as power and free conveyors, automated electrified monorails, chain monorails, overhead skid systems, and the like. The carrier may advantageously be configured to carry a workpiece mounted to a skid or to directly carry the workpiece. The suitably of the invention for use with power and free conveyor systems permits the efficient transportation of workpiece from process to process, including negotiation of horizontal turns and elevation changes as well as operation in a continuous mode, indexing mode, or individually stopping workpieces at selected locations. The invention also permits simplification of the tank design with a single conveying path and a return that may be accomplished outside of the process flow. Different chains may be used to move the workpieces and carriers through different operations without requiring auxiliary devices to transfer the bodies to different systems, thereby simplifying the overall operation and permitting isolation of the conveyor chains to selected operations. Further, with the carriers being independent of the conveyor, the carriers can be repaired offline without adversely impacting the process flow. Additionally, the conveyor assembly facilitates incorporation of strip out where desired and minimize the spacing between workpieces to achieve shorter tank lengths.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 6 is a top plan view similar to that shown in FIG. 5 showing an alternative tank configuration and conveyor orientation;

DETAILED DESCRIPTION OF THE PREFERRED EMBODIMENT

Figure 1:
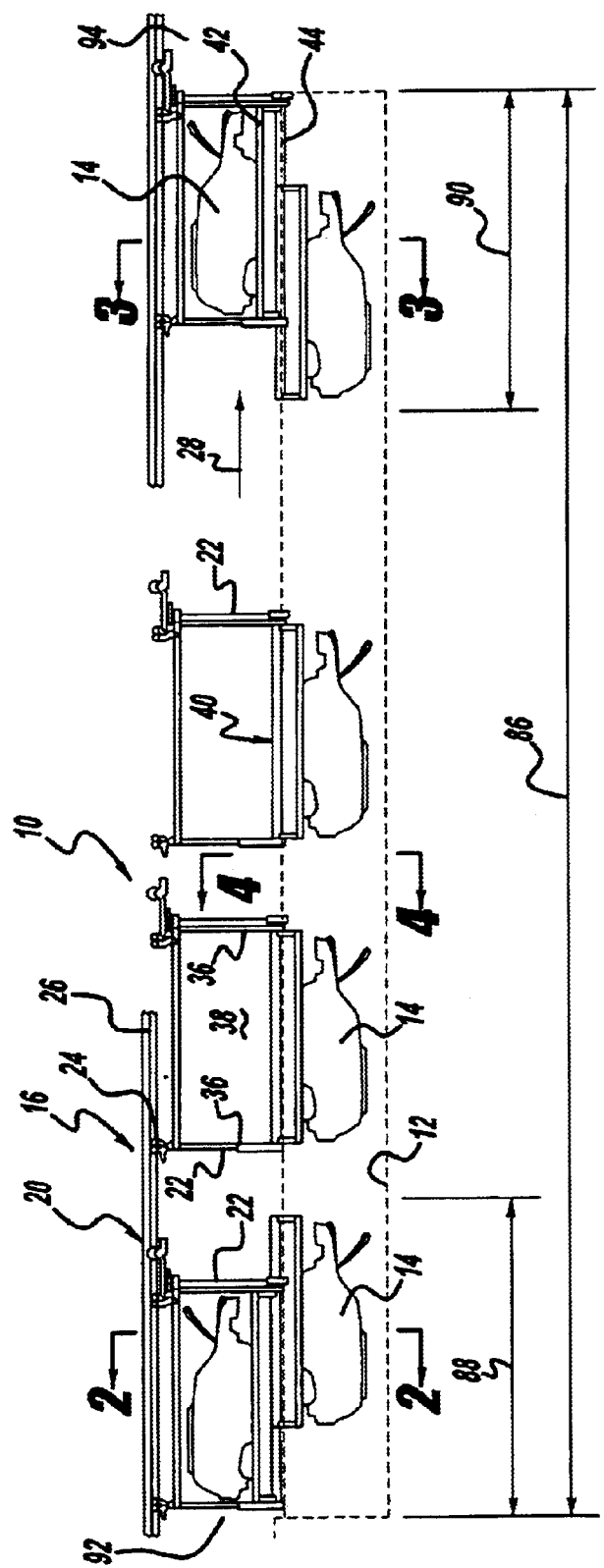
FIG. 1 is a side elevational view of a first embodiment of the treatment system of the present invention.

The present invention is generally directed to a workpiece treatment system 10 having one or more fluid filled tanks 12 into which workpieces 14, transported by a conveyor assembly 16, are immersed for treatment. The system 10 is illustrated as a vehicle body treatment system such as those used to clean or otherwise treat the body prior to painting. However, it will be appreciated that the system may be used to treat other types of workpieces.

The conveyor assembly 16 includes a conveyor 20, shown as an overhead power and free conveyor. A plurality of carriers 22 are suspended below the conveyor 20 and positioned to be driven by the conveyor, such as by coupling the carriers 22 to free trolleys 24 riding in a conveyor free track 26, along a conveying direction or path 28. The conveying direction is generally aligned with the tank(s) 12 and the conveyor assembly is configured to rotate the workpieces relative to the carriers, about an axis aligned with the conveying direction, and between an upright position where the workpieces are completely removed from the fluid and a lowered position where the workpieces are fully immersed in the fluid.

Figure 2:
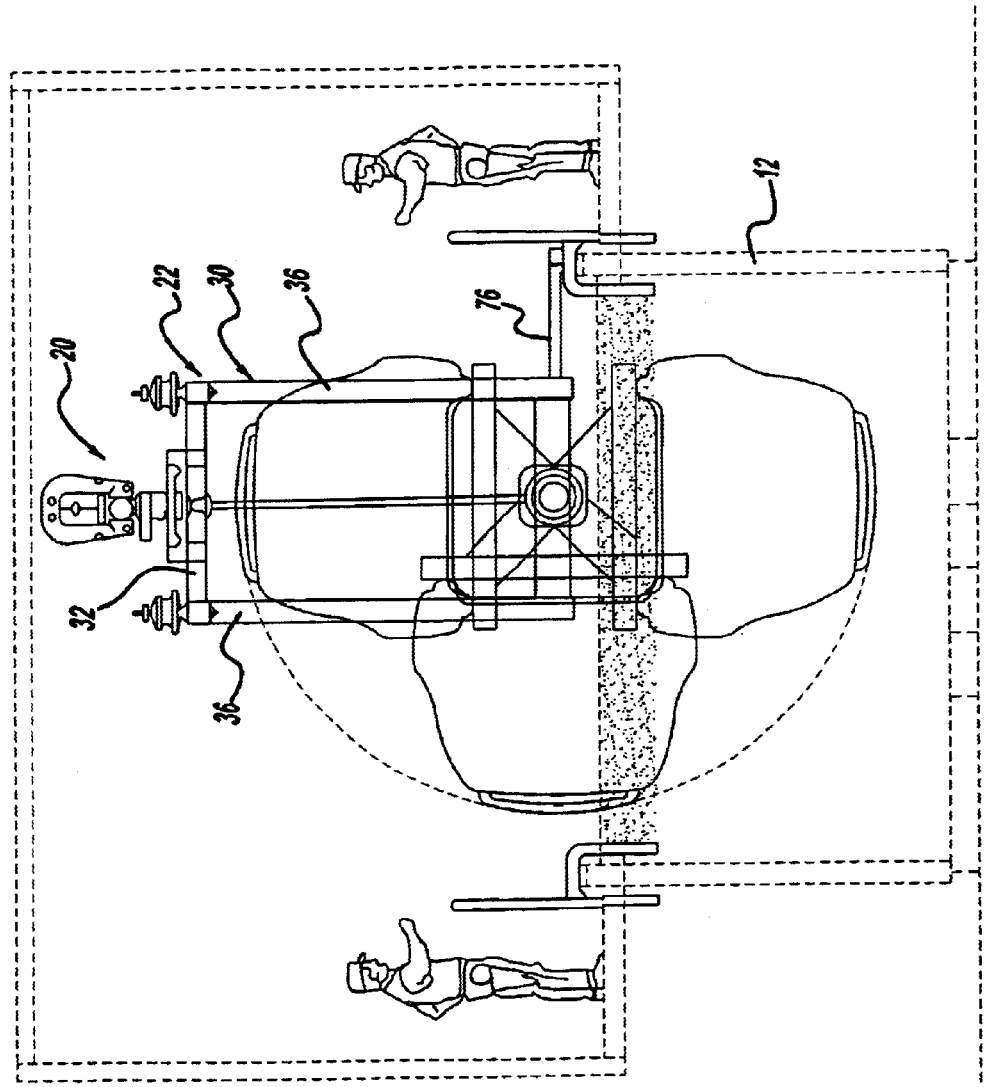
FIG. 2 is a sectional view taken along the line 2—2 shown in FIG. 1.
Figure 3:
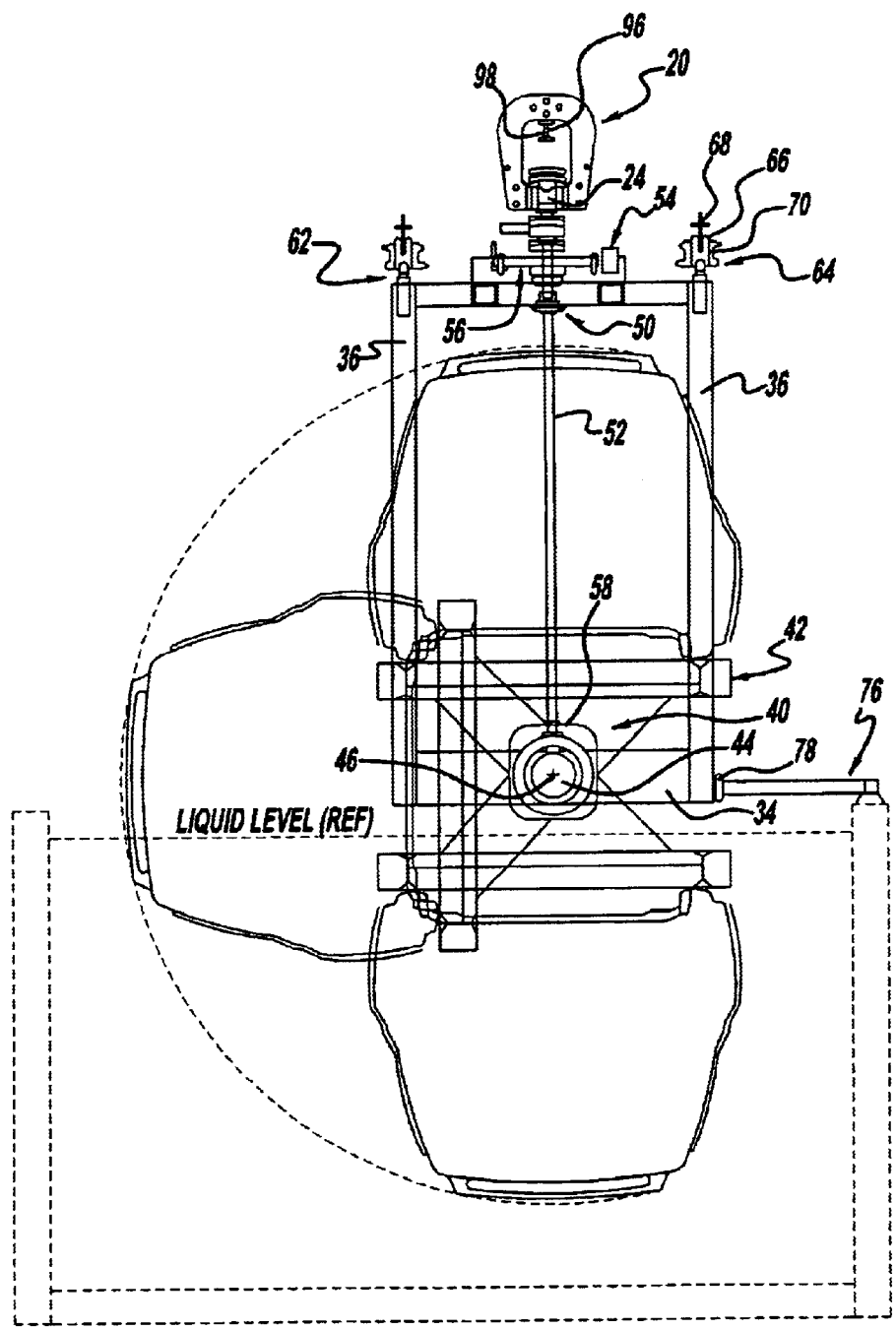
FIG. 3 is a sectional view taken along the line 3—3 shown in FIG. 1.
Figure 4:
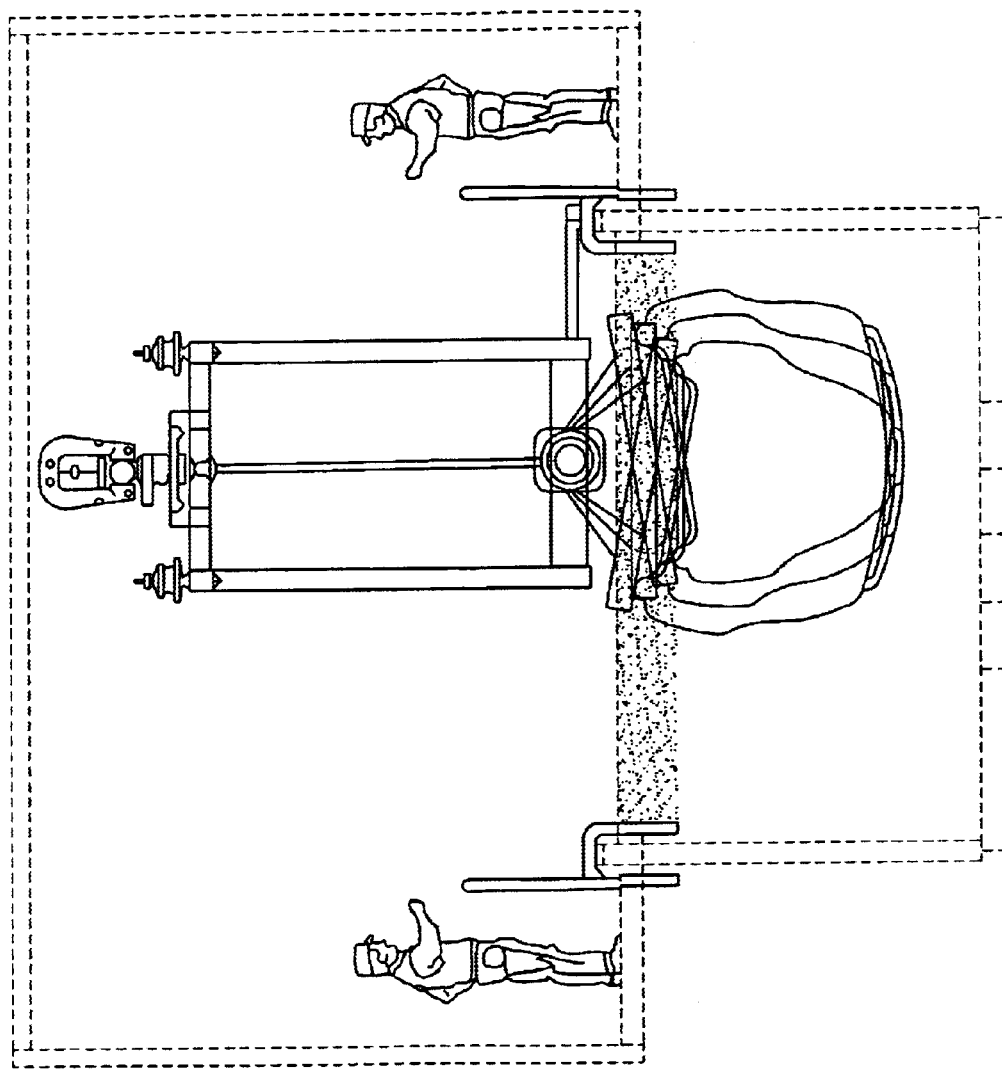
FIG. 4 is a sectional view taken along the line 4—4 shown in FIG. 1.

With reference to FIGS. 1–4 showing a first embodiment of the invention, the carriers 22 each include a support frame 30 having upper, lower, and side members 32, 34, and 36, respectively. The side members 36 are spaced from one another on at least one side of the carrier to provide an open area 38 (FIG. 1) through which the workpiece may pass when rotated. The conveyor assembly 16 further includes a rotating mechanism 40 and a mounting frame 42 (FIG. 3). The rotating mechanism includes a rotatable shaft 44 coupled to the lower frame members 34, centered between the side members 36 and rotatable about a rotary axis 46 that is parallel to the conveying direction 28. The mounting frame 42 is configured to receive the workpieces and includes a conventional coupling assembly, such as sliding or pivoting latches that clamp through the workpiece or onto a surface of the workpiece, for removably fixing the workpieces to the mounting frame. The mounting frame 42 rotates with the shaft 44 so as to selectively rotate the workpieces between their upright and lowered positions.

In order to rotate the workpieces at selected locations along the conveying path 28, the rotating mechanism 40 also includes an actuating assembly 50 (FIG. 3) interacting with the rotatable shaft 44. While two such assemblies using geared engagements are described below, a variety of alternative mechanisms for rotating the workpieces may be used—including other mechanical assemblies, motor driven shafts, electrical actuators, or camming engagements. The selection of an appropriate actuating assembly will generally be impacted by the operational goals of the workpiece treatment system. For example, the present invention is suitable for use with a variety of conveyors, some of which may permit the stopping or accumulation of workpieces at selected locations. In these instances, a suitable actuating assembly, such as motor driven or electrical actuators, may be used to rotate the workpiece while the carrier is stationary. It should also be appreciated that the actuating assembly 50 used with the present invention preferably provides controlled rotation of the workpiece and mounting frame, includes a locking feature for securely maintaining the workpiece in a stationary position, and may include guide or alignment mechanisms to ensure proper alignment and engagement of the actuating gears or other assemblies.

The actuating assembly 50 shown in FIGS. 1–4 includes a rotatable actuating shaft 52 that moves with each carrier 22 and actuating gears 54 fixed at selected positions along the conveying path. The actuating shaft 52 includes a first end 56 positioned to interact with the actuating rack, cam, or gear 54 and rotate the actuating shaft 52 as said first end moves along the actuating gear. A second geared end 58 of the actuating shaft 52 interacts with the rotatable shaft 44 to rotate the shaft 44 upon rotation of the actuating shaft 52. In the embodiment shown in FIGS. 1–4, the actuating gear 54 is stationary and the actuating shaft 52 extends vertically downward to the rotatable shaft 44. Notwithstanding the representative illustration of the actuating assembly 50 provided herein, those skilled in the art will appreciate that a variety of conventional mechanisms may be used to induce rotation of the actuating shaft 44 without departing from the scope of the invention defined by the appended claims.

Figure 7:
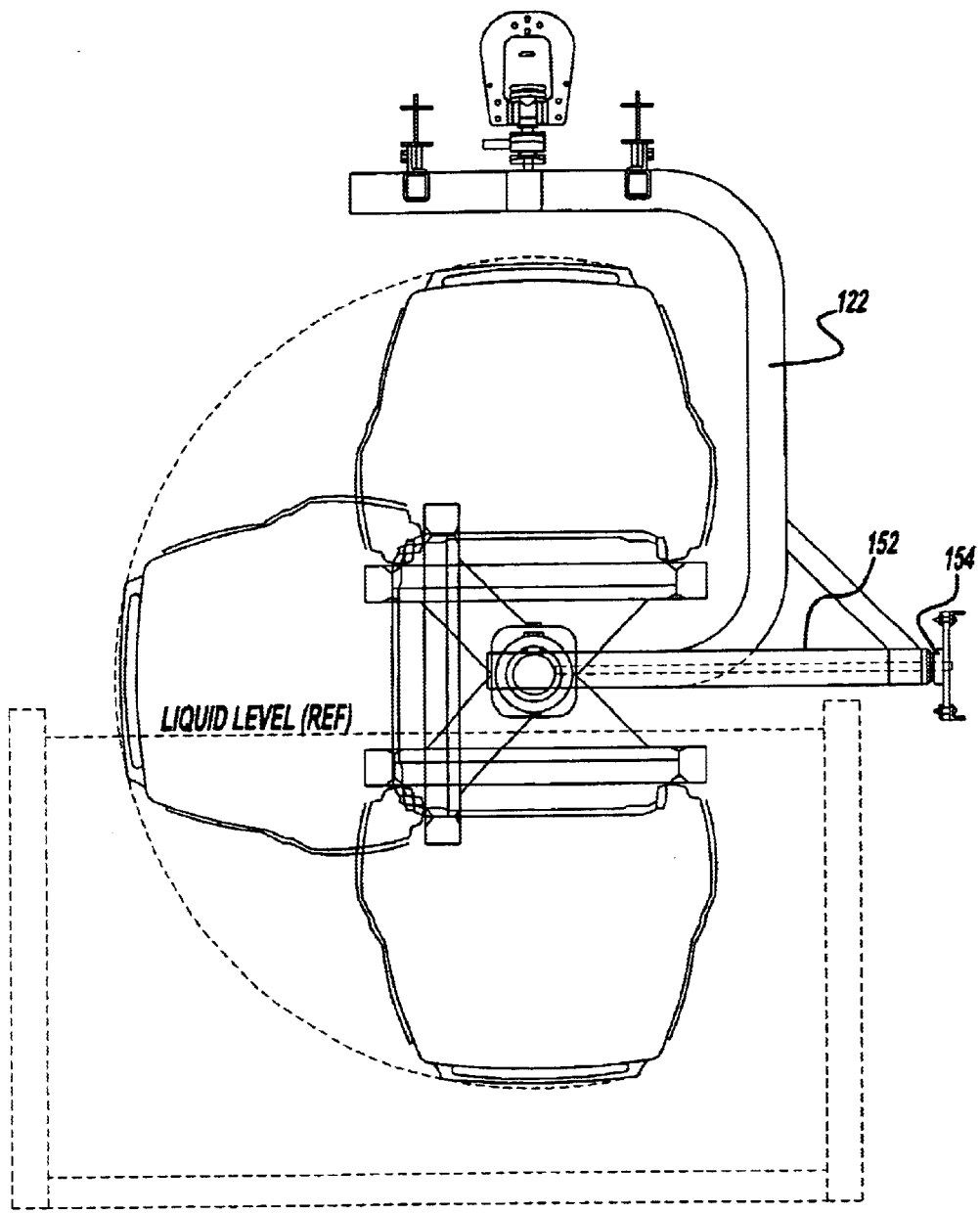
FIG. 7 is a front elevational view of a second embodiment of the conveyor assembly of the present invention.

An alternative arrangement for the carrier and actuating assembly is shown in FIG. 7 to include a C-shaped carrier 122 and a horizontal geared actuating shaft 152 extending transverse to said conveying direction. This actuating assembly includes stationary actuating racks, cams, or gears 154 selectively located along the conveying direction to induce rotation of the workpieces.

The conveyor assembly 16 further includes a stabilizer assembly (FIGS. 2–4) to maintain the carriers 22 in proper alignment relative to the conveyor 20. The stabilizer assembly may extend the length of the tanks 12 or be positioned only in areas where the workpiece is rotated so as to resist moments generated about the rotary axis due to rotation of the mounting frame and workpiece. In the illustrated embodiment the stabilizer assembly includes first and second stabilizers 62 and 64, respectively (FIG. 3). These stabilizers are shown to extend the length of the tanks and to be positioned on opposite sides of the conveyor 20. The first and second stabilizers each include a first element, such as the illustrated wheeled trolley 66, fixed to move with each carrier 22 and a second element, such as the illustrated I-beam 68, that is stationary relative to the moving carrier 22. The wheeled trolley is disposed to engage lower beam flanges 70 and to move within the I-beam channels.

The stabilizer assembly is further illustrated in FIGS. 2 and 3 to include a third stabilizer 76 located in areas where the workpiece is rotated. The third stabilizer 76 is shown to include a cantilevered cam roller 78 positioned to engage a reaction surface on the carrier to stabilize the carrier during workpiece rotation. Notwithstanding the exemplary illustrations of the stabilizer assembly provided herein, those skilled in the art will appreciate that a variety of other configurations may be used to stabilize the carrier frame and workpiece along the conveying path and particularly in areas where the workpiece is rotated into or out of the fluid.

In operation, each vehicle body 12 is fixed for rotation with and transported by the conveyor assembly 16 through a treatment area 86 (FIG. 1). When each carrier 22 reaches a first rotation area 88 the geared end 56 of the actuating shaft 52 engages a first actuating rack or gear 54 so as to cause rotation of the actuating shaft, rotatable shaft 44, mounting frame 42, and the vehicle body through an arc of approximately 180°. As a result of the rotation, the vehicle body is completely immersed into the fluid. The vehicle body 12 preferably remains fully immersed until the carrier 22 enters a second rotation area 90 whereupon the actuating shaft 52 engages a second actuating rack or gear and the vehicle body is rotated out of the fluid. It should be appreciated that additional actuating gears or other mechanisms may be selectively positioned in waggle zones (FIG. 4) along the conveying direction to move the body back and forth thereby dispersing any air bubbles that may be present or otherwise ensuring complete coating of the body. For completeness, it is noted that while gears are described herein to induce rotation of the workpiece, a variety of alternative actuation assemblies may be used. For example, it is contemplated that a cam rather than geared engagement may be used for certain applications so as to facilitate smooth and controlled rotation of the workpiece.

The conveyor assembly 16 may be used solely to transport the workpieces through the treatment area 86 in which case the assembly would also include load/unload stations at the entrance and exit ends 92 and 94, respectively, of the treatment area. However, the conveyor assembly 16 of the present invention is configured to be suitable for use in other assembly areas commonly associated with vehicle body treatment, such as delivery systems to and from various processes and buildings, ovens, and paint. The conveyor assembly 16 may also be configured for transversing horizontal turns and elevation changes, such as through vertical curves, to suit the treatment installation.

Overhead conveyors are commonly used to transport vehicle bodies through assembly areas. However, in vehicle dipping areas, conventional conveyors immerse the vehicle bodies into and remove the bodies from the fluid by rotating the bodies in the conveying direction 28 and oftentimes end over end rather than sideways rotation as in the present invention. As the length of the vehicle body is generally greater than its height, an overhead conveyor would interfere with end over end rotation. Thus, conventional treatment systems that rotate the vehicle body do not contemplate the use of overhead conveyors. Conversely, the present invention provides an overhead conveyor assembly that can accommodate vehicle bodies longitudinally aligned with the conveying direction 28. Notwithstanding this benefit, it should be appreciated that the present invention is not limited to applications where the vehicle bodies are longitudinally aligned with the conveying direction.

As is generally noted above and shown in the drawings, the conveyor 20 is preferably a power and free conveyor having a power track 96, a drive chain 98 (shown in FIG. 3) disposed in the power track, as well as the aforementioned free track 26 and trolleys 28 disposed in the free track for driving engagement with dogs extending from the drive chain. Power and free conveyors provide numerous operational benefits including workpiece accumulation, stopping workpieces for operations, switching, elevation changes, horizontal speed control, and accommodating different conveying speeds. While the present invention specifically contemplates the use of chain type power and free conveyors, other overhead conveyors may also be used—including chain, belt, or electrified monorails with carriers directly coupled to the drive mechanism. The selection of an appropriate conveyor for a production area is within the knowledge of one skilled in the art and dependent on a variety of factors including maintaining through-put rates for the system, the size and weight of the workpiece, and the nature of the assembly, manufacturing, or production processes to be performed on the workpiece.

Figure 5:
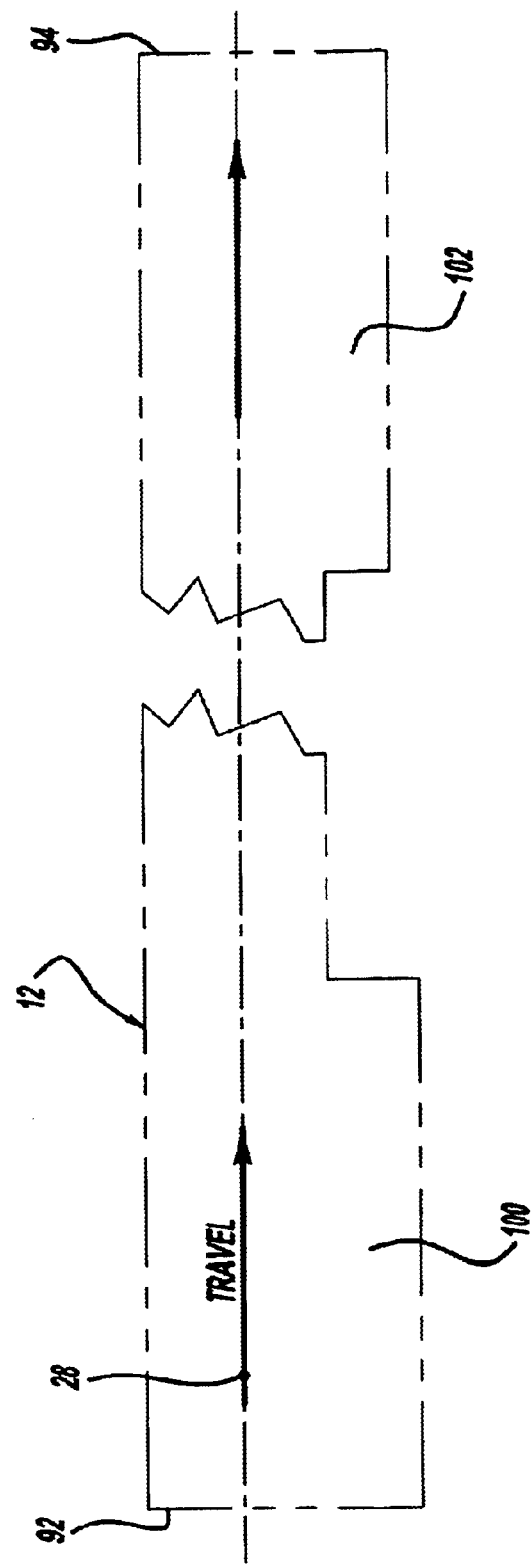
FIG. 5 is a top plan view of the treatment system shown in FIG. 1 and illustrating a tank configuration and conveyor orientation relative thereto.

A variety of conveyor and tank layouts and configurations may be used to further enhance the efficiency of the treatment system 10 using the conveyor assembly 16. The following are two examples that accommodate lateral displacement of the workpiece during rotation without unduly increasing the size of the tanks 12 or volume of fluid needed for treatment. FIG. 5 shows that the tank may include enlarged sections 100 and 102 at the entrance end 92 and/or exit end 94 to accommodate the lateral displacement of the vehicle bodies during rotation. Alternatively, as shown in FIG. 6, the conveyor centerline 104 may be initially offset from the tank centerline 106 at the entrance and exit ends 92 and 94. One skilled in the art will be readily able to determine the lateral extent of sections 100 and 102 or the magnitude of the tapered offset 108 for any particular application based on, for example, the transport speed in the conveying direction, the size of the body, and the rate of rotation.

Figure 8:
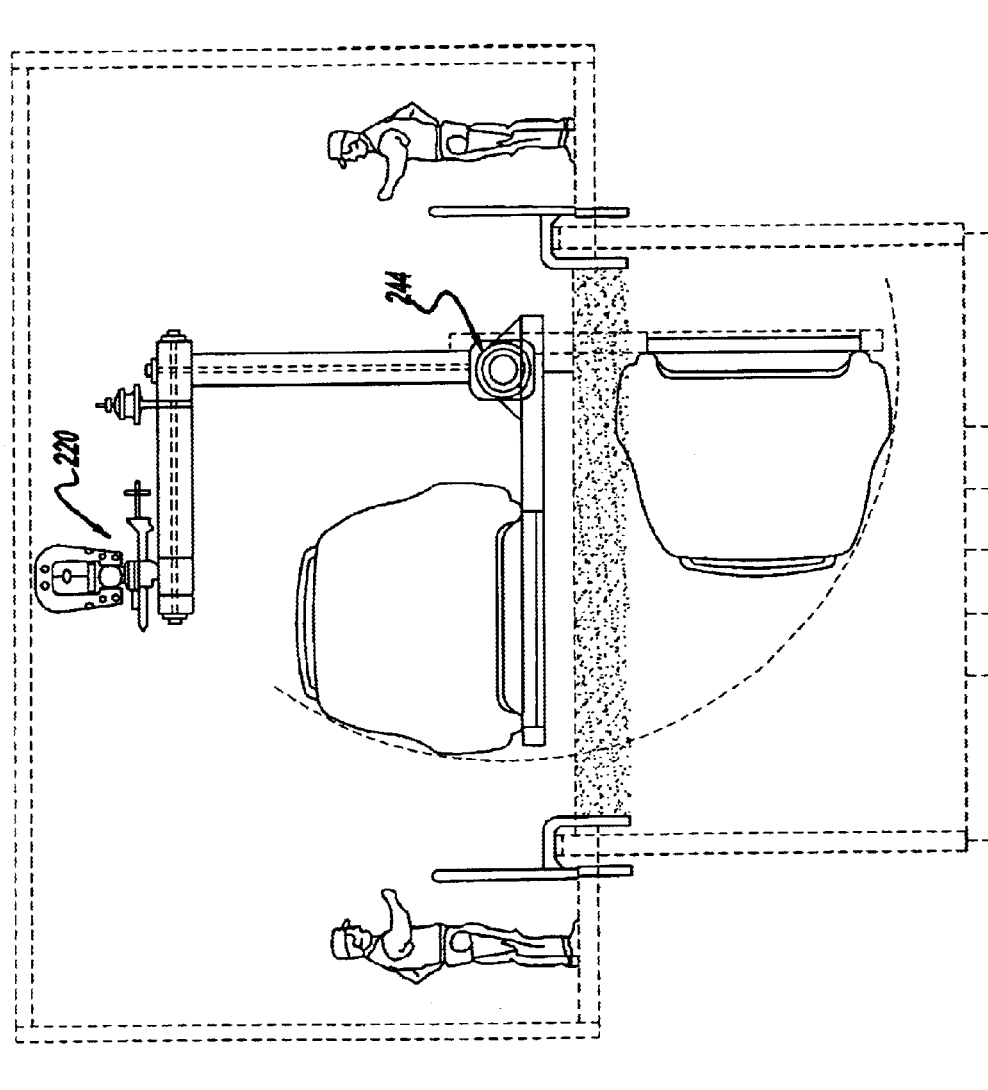
FIG. 8 is a front elevational view of a third embodiment of the conveyor assembly of the present invention.

Yet another embodiment of the conveyor assembly of the present invention is illustrated in FIG. 8. In this embodiment, the workpiece is rotated through a 90° arc rather than the 180° arc of the previously described embodiments. This lesser magnitude of rotation may be particularly suitable for applications wherein it is desirable to reduce the stress on the body floor pan during rotation or reduce the required width of the treatment tank. More generally, the embodiment illustrated in FIG. 8 shows that various modifications may be made to the invention without departing from the scope thereof. For example, the rotatable shaft 244 is vertically below yet horizontally offset from the conveyor 220 and includes various other modifications, such as to the carrier body.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A conveyor assembly for transporting workpieces comprising:
   a conveyor defining a conveying direction; and
   a carrier assembly operably coupled to the conveyor, said carrier assembly including a carrier frame having a lower support, a rotating mechanism coupled to move with the carrier and having a rotatable shaft with a rotary axis parallel to the conveying direction, and a workpiece mounting frame coupled to rotate with said rotatable shaft, and wherein said workpiece mounting frame moves relative said lower support as said workpiece mounting frame rotates with said rotatable shaft.

2. The conveyor assembly of claim 1 wherein said carrier assembly is suspended below said conveyor.

3. The conveyor assembly of claim 2 wherein the rotary axis is positioned vertically below and aligned with said conveyor.

4. The conveyor assembly of claim 1 wherein said workpiece mounting frame includes a workpiece coupling assembly to receive a workpiece for movement with the mounting frame, said carrier frame includes a lower support, and said mounting frame is rotatable between a raised position wherein said coupling assembly is above said lower support and a lowered position wherein said coupling assembly is below said lower support.

5. The conveyor assembly of claim 4 wherein said rotating mechanism further includes an actuating assembly interacting with the rotatable shaft to rotate the rotatable shaft at selected locations along said conveying direction.

6. The conveyor assembly of claim 5 wherein said actuating assembly includes a rotatable actuating shaft and a stationary actuating gear, said actuating shaft moving with said carrier frame and having a first end and a second end, said first end positioned to interact with said actuating gear and to rotate said actuating shaft as said first end moves along said actuating gear, said second end interacting with said rotatable shaft to rotate said rotatable shaft upon rotation of said actuating shaft.

7. The conveyor assembly of claim 6 wherein said actuating shaft is oriented vertically and extends below said conveyor.

8. The conveyor assembly of claim 6 wherein said actuating shaft is transverse to said conveying direction.

9. The conveyor assembly of claim 1 wherein said conveyor is a power and free conveyor having a power track, a drive mechanism disposed in said power track, a free track, and trolleys disposed in said free track for driving engagement with said drive mechanism, said carrier fixed to move with at least one of said trolleys.

10. The conveyor assembly of claim 1 wherein said carrier assembly is configured to rotate the workpiece through an angle of approximately 180°.

11. The conveyor assembly of claim 1 wherein said carrier assembly is configured to rotate the workpiece through an angle of approximately 90°.

12. A conveyor assembly for transporting workpieces comprising:
a conveyor defining a conveying direction;
a carrier assembly operably coupled to said conveyor, said carrier assembly including a carrier frame having a lower support, a rotating mechanism coupled to move with said carrier and having a rotatable shaft with a rotary axis parallel to the conveying direction, and a workpiece mounting frame coupled to rotate with said rotatable shaft and wherein said workpiece mounting frame includes a workpiece coupling assembly to receive a workpiece for movement with said workpiece mounting frame, and said workpiece mounting frame is rotatable between a raised position wherein said coupling assembly is above said lower support and a lowered position wherein said coupling assembly is below said lower support; and
a stabilizer assembly having a first stabilizer with a first element fixed to said carrier frame and a second stationary element, said first element engaging said second element when said mounting frame is rotated to resist moments generated by rotation of said mounting frame.

13. The conveyor assembly of claim 12 wherein said stabilizer assembly further includes a second stabilizer also having a first element fixed to said carrier frame and a second stationary element, said first and second stabilizers positioned on opposite sides of said conveyor.

14. The conveyor assembly of claim 13 wherein said stabilizer assembly includes a third stabilizer also having a first element fixed to said carrier frame and a second stationary element, said third stabilizer positioned to engage a side of the carrier.

15. A conveyor assembly for transporting workpieces comprising:
a conveyor defining a conveying direction; and
a carrier assembly operably coupled to said conveyor, said carrier assembly including a carrier frame, a rotating mechanism coupled to move with said carrier and having a rotatable shaft with a rotary axis parallel to the conveying direction, and a workpiece mounting frame coupled to rotate with said rotatable shaft, said workpiece mounting frame configured to displace the workpiece from said rotary axis.

16. The conveyor assembly of claim 15 wherein each workpiece defines an outer envelope and wherein said rotatable shaft is displaced outside the outer envelope of each workpiece.

17. The conveyor assembly of claim 15 wherein said mounting frame and each workpiece is rotatable between a raised position and a lowered position wherein said coupling assembly and each workpiece are substantially above said rotatable shaft in said raised position.

18. A conveyor assembly for transporting workpieces comprising:
a conveyor defining a conveying direction; and
a carrier assembly operably coupled to said conveyor, said carrier assembly including a carrier frame, a rotating mechanism coupled to move with said carrier and having a rotatable shaft with a rotary axis parallel to the conveying direction, and a workpiece mounting frame coupled to rotate with said rotatable shaft, a workpiece coupled to said workpiece mounting carrier frame and wherein said workpiece mounting frame are rotatable between a raised position wherein said workpiece is substantially above said rotary axis and a lowered position wherein said workpiece is substantially below said rotary axis.

* * * * *

UNITED STATES PATENT AND TRADEMARK OFFICE
CERTIFICATE OF CORRECTION

PATENT NO. : 6,902,051 B2
DATED : June 17, 2005
INVENTOR(S) : Noel F. Dehne et al.

It is certified that error appears in the above-identified patent and that said Letters Patent is hereby corrected as shown below:

<u>Title page,</u>
Item [56], References Cited, U.S. PATENT DOCUMENTS, "6,745,888 B2 * 6/2004 Nishida et al." should be -- 6,745,888 B2 * 6/2004 Sagane et al. --.

Signed and Sealed this

Sixteenth Day of August, 2005

JON W. DUDAS
*Director of the United States Patent and Trademark Office*